United States Patent [19]

Tse et al.

[11] Patent Number: 4,894,107
[45] Date of Patent: Jan. 16, 1990

[54] PROCESS FOR MAKING MULTIPLE LAYER POLYMERIC FILMS

[75] Inventors: Samuel W. Tse, Appleton; Almar T. Widiger, Neenah; Keith D. Lind, Appleton, all of Wis.

[73] Assignee: American National Can Company, Greenwich, Conn.

[21] Appl. No.: 735,082

[22] Filed: May 16, 1985

[51] Int. Cl.$^4$ ............................................. B32B 31/30
[52] U.S. Cl. ............................... 156/229; 156/244.24; 156/272.2; 156/309.9; 156/322; 156/324; 156/333; 264/22; 264/171; 264/290.2
[58] Field of Search ................... 428/515, 520; 264/22, 264/171, 290.2; 156/229, 244.11, 244.14, 244.24, 272.2, 309.9, 322, 324, 333

[56] References Cited
U.S. PATENT DOCUMENTS 3,645,822  2/1972  Widiger ........................... 156/244.14
4,112,181  9/1978  Baird, Jr. ............................. 428/339
4,352,702  10/1982  Bornstein ........................ 156/244.14
4,379,117  8/1983  Baird .
4,457,960  7/1984  Newsome ............................. 428/35
4,469,742  9/1984  Oberle .
4,472,227  9/1984  Toyoda ........................... 156/244.24
4,605,460  8/1986  Schirmer ........................ 156/244.24

Primary Examiner—Merrell C. Cashion, Jr.
Attorney, Agent, or Firm—Paul R. Audet

[57] ABSTRACT

Novel films, and processes for making them, are provided. The films are characterized by the inclusion of a layer of vinylidene chloride copolymer between at least two other layers which contain ethylene vinyl acetate, and optionally linear low density polyethylene. The films may be unoriented or oriented. Oriented films may optionally be cross-linked. The novel process of making the cross-linked films includes the step of cross-linking the film after assembly of the vinylidene chloride copolymer layer into the structure.

25 Claims, 1 Drawing Sheet

PROCESS FOR MAKING MULTIPLE LAYER POLYMERIC FILMS

BACKGROUND OF THE INVENTION

Heat shrinkable polymer films have gained substantial acceptance for such uses as the packaging of meats. This description will discuss the usage of films for packaging meat; it being understood that these films are also suitable for packaging other products. Some of the films embodying this invention are normally used as heat shrinkable bags supplied to a meat packer with one open end, to be closed and sealed after insertion of the meat. After the product is inserted, air is normally evacuated, the open end of the bag is closed, such as by heat sealing or applying a metal clip, and finally heat is applied, such as by hot water or hot air, to initiate shrinkage about the meat product.

In subsequent processing of the meat, the bag may be opened and the meat removed for further cutting of the meat into user portions, for retail sale, for example, or for institutional use.

Successful shrink bags must satisfy a multiplicity of requirements imposed by both the bag producer and the bag user. Of primary importance to the bag user is the capability of the bag to survive physically intact the process of being filled, evacuated, sealed closed, and heat shrunk. The bag must also be strong enough to survive the material handling involved in moving the contained product along the distribution system to the next processor, or to the user. Thus, the bag must physically protect the product.

It is also highly desirable to the bag user that the bag serve as a barrier to infusion of gaseous materials from the surrounding environment. Of particular importance is provision of an effective barrier to infusion of oxygen, since oxygen is well known to cause spoilage of food type products.

The bag producer requires a product which can be produced competitively, while meeting the performance requirements of the user. Thus the bag material should be relatively inexpensive to purchase, should be readily extrudable, and susceptible to orientation, with sufficient leeway in process parameters as to allow for efficient film production. The process should also be susceptible to extended production operations.

The orientation temperature should be a temperature which is economically achieved by the producer, and which provides for use of economical shrink processes by the bag user.

During fabrication and use of the film, it must be tough enough to withstand the various high temperature operations to which it is subjected, including heat sealing, and in some cases shrinking. Thus, its strength at high temperature, hereinafter referred to as hot strength, is an important consideration.

Conventional shrink bags have generally been constructed with ethylene vinyl acetate copolymers (EVA). In some cases the bags contain a layer of a vinylidene chloride-vinyl chloride copolymer (VDC-VC) to serve as an oxygen barrier. Ethylene vinyl alcohol copolymer (EVOH) is also known as an oxygen barrier material.

Notwithstanding the several shrink films which are available, and the advantages of shrink packaging, shrink packaging is not without its difficulties, many of which are attributable to limitations in the film. As will be appreciated, the processes of stretching the film, and later shrinking it, expose the film to rather severe conditions, due to the nature of the operations.

It is especially important to appreciate that the film is particularly vulnerable to failure at conditions of operation, due to the high temperatures to which it is exposed in the orientation and shrinking processes. The film must be susceptible to orientation without distortion or separation of the multiple layers which are normally present in films of this nature. The film must be strong enough, at the orientation temperature to withstand the stresses of stretching without the creation of holes, tears, or non-uniform zones of stretching.

In the case of tubularly oriented films, the film must be capable of supporting the stretching bubble during the orientation process. Finally, each of the layers of the film should be susceptible to orientation without fracture, separation, or creation of holes in the layer.

In packaging use, the film must respond to heat rapidly enough in the shrinking process for commercial practicality and yet must not exhibit such a level of shrink energy as would cause the film to pull apart or delaminate during shrinkage, under its own internal forces. Moreover, the shrink related problems are increased when the contained product, such as a cut of meat includes protrusions such as bones, and/or significant cavities in its surface.

Particularly in the case of cavities in the product, such as around the interior of the rib section in a cut of meat, the redistribution of an area of the film adjacent the cavity places an extra strain on the ability of the film to conform to the product in the shrinking process while maintaining film continuity.

Another area where film packages are known to be susceptible to failure is at any area where portions of the film are sealed to each other by a heat seal. In the formation of a heat seal, at least portions of the film are heated to a temperature where they are soft enough to flow and be melt merged when simultaneously subjected to pressure. It is desirable to be able to form heat seals in a film over a range of temperatures and pressures so that commerical processes can fluctuate within the normal operating parameters. Whatever the acceptable range of conditions of formation of heat seals, it is critical that the seals have adequate strength to hold the package closed, and prevent leakage into or out of the package until it is intentionally opened. Thus the strength of heat seals is also one of the important measures of the value of films which are used in applications where heat seals are formed.

The common factor in all these situations is that the film is heated to a high temperature, at which it may be softened, and an operation is performed, usually by deformation such as stretching, shrinking, and softening and merging to form a heat seal. While the film needs to be sufficiently deformable to perform a desired function, it need also have sufficient hot strength to not become so soft that it flows uncontrollably and assumes undesired shapes, such as by melting, developing holes, and the like.

It is generally known that cross-linking of polymer films improves their toughness and hot strength. It is known as a process to cross-link one layer of a multiple layer film containing a VDC-VC copolymer. This cross-linking of a single layer of a multiple layer film consists of a plurality of steps. For example, first the layer to be cross-linked is formed. Second, the formed layer is cross-linked. Third, additional layers are added to the cross-linked layer, as by extrusion coating, to form a multiple layer film. Finally, the multiple layer film is heated to orientation temperature and oriented. While this process may produce a functional film, it would be desirable to invent a process which might be less complex, require fewer steps, perhaps improve the inter-layer adhesion, and perhaps be more economical.

As regards the above described known process, it is seen that only one of the layers is cross-linked. A typical film has two outer layers of EVA and an inner layer, between the two EVA layers, of VDC-VC copolymer. One of the EVA layers is cross-linked and the other is not. With a plurality of processing steps required to form a film by the above-iterated known process, it is seen that processing economics might be attained by a different process, particularly if the number of processing steps can be reduced.

It is an object of this invention to provide improved film structures for use in packaging, especially for use in polymeric bags; and process for making film structures and packages. It is a special object to make films having improved properties for packaging uses, and to make them by processes which are competitive and economical as compared to previously available processes.

SUMMARY OF THE INVENTION

It has now been found that these and other objectives are achieved in novel films and processes of the invention. Films of the invention are represented by a multiple layer polymeric film having first and second layers whose compositions have a significant fractions of EVA. A third layer of a vinylidene chloride copolymer (VDC-CP) is disposed between the first and second layers.

In some embodiments, the composition of at least one of the first and second layers is a blend of 10% by weight to 90% by weight linear low density polyethylene (LLDPE) and 90% to 10% EVA.

In more preferred embodiments, the compositions of the first and second layers are 20% to 40% LLDPE and 80% to 60% EVA. In these more preferred embodiments, the EVA is characterized by having 6% to 12% vinyl acetate content and by having a melt index of 0.2 to 0.8. The LLDPE has a melt index of 0.5 to 1.5.

While the composition of the third layer may be any of the vinylidene chloride copolymers, preferred compositions for the third layer are vinylidene chloride-acrylate type copolymers, especially vinylidene chloride-methylacrylate (VDC-MA).

The films of the above-described layers, with their various combinations of compositions in the layers, are highly useful as shrink film products, and so it is customary, though not essential, that films of the invention be molecularly oriented. And while the films of the invention may be oriented without cross-linking of any of the layers, cross-linking can impart desired improvements in the shrinking, heat sealing, and hot strength properties, and perhaps interlayer adhesion. Thus the most preferred films of the invention are irradiated in order to induce cross-linking in the film. Preferred levels of irradiation are of the order of 1.5 to 10 megarads.

In the most preferred films of the invention, the composition of each of the first and second layers is again made from a major fraction of EVA copolymer. A third layer is made from VDC-MA copolymer, and is between the first and second layers. By the time the fabrication of the film has been completed, all of the first, second and third layers have been subjected to electron beam irradiation in an amount of at least 1.5 megarads.

In another family of embodiments of the preferred oriented films of the invention, the first and second layers each have two opposing surfaces and have essentially the same composition, each as the other; the first and second layers being defined as a first pair of layers. The third barrier layer of VDC-CP is between, and in surface-to-surface contact with the first and second layers. Fourth and fifth layers are adhered to the first and second layers on the respective surfaces opposite the third layer. The fourth and fifth layers have essentially the same composition, each as the other, and are defined as a second pair of layers. In the combined composition of the first and second pairs of layers, the composition of at least one of the pairs is at least 50% of an EVA component, the remainder of that one pair being an LLDPE. Also, the composition of at least one of the pairs is at least 10% of an LLDPE component, with the remainder of that one pair being EVA. The requirement for the components of the at least 50% EVA and the at least 10% LLDPE may be met by one of the pairs having both components or by each of the pairs having one of the components.

In one more preferred group of films of this family of embodiments, the first pair of layers is 70% to 100% EVA and the second pair of layers is 10% to 90% LLDPE.

In another more preferred group of films of this family of embodiments, the first pair of layers is 100% EVA and the second pair of layers is 50% to 90% LLDPE.

In a group of films in this family of embodiments where the roles of the first and second pairs are somewhat reversed from those just described, the first pair of layers is 50% to 100% LLDPE and the second pair of layers is 50% to 100% EVA. Indeed, in one preferred version of this group, the first pair of layers is 90% to 100% LLDPE and the second pair of layers is 90% to 100% EVA.

The films of the above-described family of oriented films having at least 5 layers may be successfully fabricated and used without the cross-linking of all of the several polymer layers. However, as with the previously described families of films, which may have less than five layers, the hot strength and heat seal properties of these films may be enhanced by subjecting them to cross-linking processes; and so it is especially desirable that the first, second, and third layers, of the embodiments having at least 5 layers, be cross-linked by exposure to at least 1.5 megarads of electron beam irradiation.

The invention includes special and novel processes for making the cross-linked films of the invention. The first step is forming a multiple layer film having in it the layers to be exposed to the electron beam irradiation, including a layer of VDC-CP. The second step is heating the multiple layer film to molecular orientation temperature and molecularly orienting it. The third step is subjecting the multiple layer film to electron beam irradiation in an amount of at least 1.5 megarads, preferably 2 to 5 megarads. Optionally, the film may be heat set.

The films of the invention are highly satisfactory for many purposes, including making flexible bags and the like for packaging use. Certain ones of the oriented films are highly desirable for use in making shrink bags, wherein the bag is caused to shrink about the contained product, by the application of heat to the bag to activate its shrink properties.

DETAILED DESCRIPTION OF THE INVENTION

Figure 1:
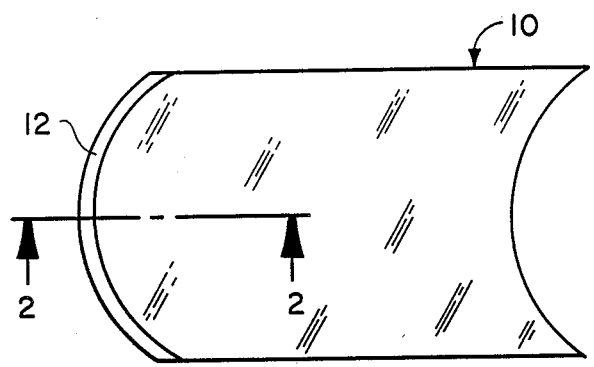
FIG. 1 is a plan view of a bag made according to the invention.

FIG. 1 shows a bag 10 made according to the invention. The empty bag shown is illustrative of bags of the invention. In the most preferred form of the invention, the bag is made from a molecularly oriented tube which has been subjected to radiation cross-linking, and except where otherwise pointed out, the remainder of this description will describe films and packages which have been molecularly oriented by the time of the completion of the manufacturing process, and which are useful for packaging foods. In FIG. 1, then, the molecularly oriented tube has one end closed by a heat seal 12 across the one end of the tube. The other end of the bag is open for insertion of product, and is normally closed and sealed after the product is put into the bag.

Figure 2:
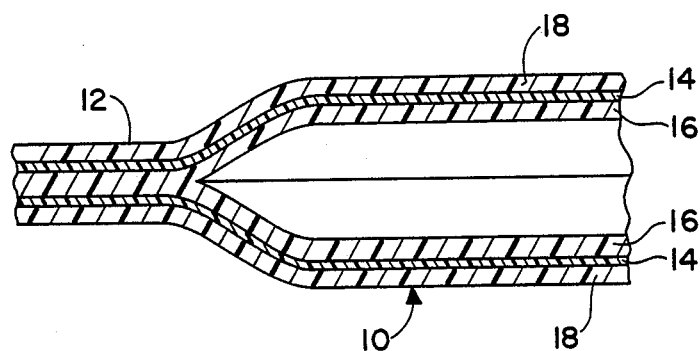
FIG. 2 is a cross-section of a bag of FIG. 1, the bag having been made from a 3 layer film structure of the invention, and taken at 2—2 of FIG. 1.

The cross-section of the bag in FIG. 2 shows a typical structure where the bag is made from a three-layer plastic film. Layer 14 is a barrier layer made from vinylidene chloride copolymer. Layer 16 is the heat seal layer. Layer 18 is the outer bag layer and serves a primary function of protecting the package and its product from physical abuse. In the form of the invention using a three-layer film as in FIG. 2, layer 18 is a blend of 10 weight percent to 100 weight percent of an EVA and 90 weight percent to 0 weight percent LLDPE. Layer 16 is also 10% to 100% EVA and 90% to 0% LLDPE. The inclusion of LLDPE is particularly desirable where the film is to be used as a shrink film, where it is heat shrunk about an enclosed product. While LLDPE is generally useful for enhancing the toughness of the film, films having LLDPE blended into at least one of the outer layers of a three-layer film exhibit particularly significant reduction in package failure rates from shrink holes, when used in shrink packaging. While smaller amounts of LLDPE do provide some improvement, generally at least 10% LLDPE is used where significant benefits are desired. Thus 10% LLDPE in at least one of layers 16 and 18 is preferred. Films having 20% to 40% LLDPE show marked improvement, so this level is especially preferred.

LLDPE polymers preferred for use in layers 16 and 18 which are blend compositions are those having a melt index (MI) of up to about 6. Especially preferred polymers have an MI of 0.5 to 1.5. Among the most preferred polymers are 2050 and 2056 from Dow Chemical Company.

As used herein, the term melt index refers to the physcial property determination described in ASTM-D1238.

The ratio of LLDPE in the blends which use it is selected to provide the best balance of properties which maximizes desirable benefits of each of the elements of the blend for the anticipated use of each specific film. While initial improvements in the film, compared to films having straight EVA in layers 16 and 18, are seen in films having as little as 10% LLDPE in layers 16 and 18, films having 20% to 40% LLDPE show marked improvements.

EVA's having lower VA content tend to yield EVA layers having better hot strength. EVA's having higher VA content tend to yield EVA layers having increased adhesion to the vinylidene chloride copolymer layer. EVA's having virtually any amount of VA will have better adhesion to the vinylidene chloride copolymer layer than an ethylene homopolymer. However, good interlayer adhesion is considered desirable in the invention, and thus steps are usually taken to enhance adhesion where no unacceptable negative effect is encountered. Thus, higher VA contents, in the range of 6% to 12% vinyl acetate are preferred. Melt index of less than 1 is preferred. While blend amounts are shown herein in weight percent, VA contents are mole percent. Especially preferred EVA's have VA content of 7% to 9% and melt index of 0.2 to 0.8. Blends of EVA's to make up the EVA component of layers 16 and 18 are acceptable and, in some cases, facilitate the orientation process.

The composition of layer 14 is a vinylidene chloride copolymer. Especially preferred is a vinylidene chloride-methylacrylate copolymer. Where methylacrylate copolymer is used, the methylacrylate component of the copolymer is preferably between 3 mole percent and 20 mole percent. Highly preferred copolymers have 6 to 12 mole percent methylacrylate. Additives typically used with vinylidene chloride copolymers may be used in conventional amounts. Exemplary of such additives are EVA, dibutylsebacate, magnesium oxide, stearamide, and epoxidized soybean oil.

The overall thickness of the films of this invention is nominally the same as the thickness of conventional films. Films are generally about 2.0 mils thick with a normal range of about 1.5 to about 3.0 mils. Films thinner than about 1.5 mils tend to be too weak to perform all required functions. Films thicker than about 3.0 mils are economically less competitive, although films up to about 20 mils are functional.

The thickness of each layer of the shrink films of this invention is preferably essentially the same as the thickness of the same layer in conventional shrink films. By way of example, in a typical film used to make a bag of FIGS. 1 and 2, the overall film thickness is 2.25 mils. Layer 14 is 0.3 mil. Layer 16 is 1.45 mils. Layer 18 is 0.5 mil. Layer thicknesses may be conveniently adjusted for any particular film. A minimum of 1.0 mil is desired for layer 16 where it is to be used for heat sealing purposes.

The compositions of the various layers are discussed herein as though the composition of any one layer is constant with time. It is considered, however, that the compositions, and particularly the molecular structures of the various polymers, are changed by cross-linking affect of the irradiation. Thus the description of the polymers, while general, should be taken to include subsequent forms thereof after irradiation.

THE PROCESS

The process of making any given film does, of course, depend on the specific composition and structure of the film, whether it is to be oriented, and whether it is to be cross-linked.

Films which are neither oriented nor cross-linked can be made by any of the conventional processes for forming multiple layer films. Such processes include extrusion, coextrusion, extrusion coating, extrusion lamination, adhesive lamination and the like, and combinations of processes. The specific process or processes for making a given film which is neither oriented nor cross-linked can be selected with average skill, once the desired structure and compositions have been determined.

Films which are oriented, but not cross-linked, can also be made by conventional processes, in combination, for forming multiple layer films. A preferred process includes the steps of coextrusion of the layers to be oriented, followed by orientation in one of the conventional processes such as blown tubular orientation or stretch orientation in the form of a continuous sheet; both being molecular orientation processes.

Films which are oriented and are cross-linked are made by a novel combination of process steps. The first step is the formation of a multiple layer film. The first step, of formation of the multiple layer film, is usually most easily accomplished by coextrusion of the desired layers of which the vinylidene chloride copolymer layer is one. Other formation processes are acceptable so long as the resulting oriented film at the conclusion of fabrication processing is a unitary structure.

The second step is orienting the multiple layer film. This is accomplished by heating the film to a temperature appropriate to molecular orientation and molecularly orienting it. The film may then be optionally heat set by holding it at an elevated temperature while its dimensions are maintained. The orientation step is preferentially carried out in line with the first step, which is the film formation step of the process.

The third step is subjecting the formed and oriented multiple layer film, including the vinylidene chloride copolymer layer, to electron beam irradiation.

The amount of electron beam irradiation is adjusted, depending on the make-up of the specific film to be treated and the end use requirement. While virtually any amount of irradiation will induce some cross-linking, a minimum level of at least 1.5 megarads is usually preferred in order to achieve desired levels of enhancement of the hot strength of the film and to expand the range of temperatures at which satisfactory heat seals may be formed. While treatment up to about 50 megarads can be tolerated, there is usually no need to use more than 10 megarads, so this is a preferred upper level of treatment; the most preferred dosage being 2 to 5 megarads.

The third step of subjecting the film to electron beam irradiation is performed only after the multiple layer film has been formed, and after molecular orientation, in those embodiments where the film is molecularly oriented. It should be noted that, in the irradiation step, all of the layers in the film are exposed simultaneously to the irradiation source, such that irraddition of all the layers of the film takes place simultaneously.

In one embodiment of the process, the second step of orientation may be omitted and the unoriented multiple layer film may be cross-linked by irradiation treatment to produce a cross-linked, unoriented, multiple layer film.

By the time processing of the film has been completed, the film has been returned to ambient temperature. Whether this occurs before or after radiation treatment is not important to success of the process and functionality of the film.

EXAMPLE 1

A three layer film was coextruded. The two surface layers of the film were a blend of 35% LLDPE and 65% EVA. The LLDPE was DOW 2050. The 65% EVA in the composition was 25% USI NA 235 and 40% DuPont 3135X, both percentages being based on the overall composition of the entire EVA-LLDPE blend. The core layer, which was positioned between the two outer layers was vinylidene chloride-methylacrylate copolymer. The thus coextruded film was heated to orientation temperature and biaxially oriented at a stretch ratio of 3.5×2.5/1. After orientation, some of the film was treated with 4.5 megarads of electron beam irradiation, and untreated samples were kept for comparison testing. The finished film was 2.3 mils thick, with 0.25 mil being the core layer.

EXAMPLE 2

A three layer film was coextruded. The two surface layers of the film were a blend of 30% LLDPE and 70% EVA. The LLDPE was DOW 2056. The 70% EVA in the composition was 30% USI NA 235 and 40DuPont 3135X, both percentages being based on the overall composition of the entire EVA-LLDPE blend. The core layer, which was positioned between the two outer layers, was vinylidene chloride-methylacrylate copolymer. The thus coextruded film was heated to orientation temperature and biaxially oriented at a stretch ratio of 3.5×2.5/1. After orientation, some of the film was treated with 4.0 megarads of electron beam irradiation, and some with 8.0 megarads, and untreated samples were kept for comparison testing. The finished film was 2.3 mils thick, with 0.3 mil being the core layer.

EXAMPLE 3

A three layer film was coextruded as in EXAMPLE 1, except that the composition of the core layer was vinylidene chloridevinyl chloride copolymer. Overall film thickness was 2.3 mils, with 0.45 mil being the thickness of the core layer. After orientation, some of the film was treated with 1 megarad of electron beam irradiation, some with 3 megarads and some with 5 megarads.

Table 1 shows properties, not otherwise shown, of the polymers cited above and used in the examples.

TABLE 1

| Cited Polymer | Polymer Properties | | |
|---|---|---|---|
| | Type of Polymer | Melt Index | Other Property |
| NA 235 | EVA | 0.35 | 4.5% VA |
| 3135X | EVA | 0.35 | 12% VA |
| 2050 | LLDPE | 1 | — |
| 2056 | LLDPE | 1 | — |

The films made in the above examples were tested for oxygen permeability, free shrink and hot strength of heat seals. Oxygen permeability was measured on a MOCON Oxygen Analyzer at 73° F., 100% R.H. and was not substantially affected by the radiation treatment.

In the free shrink test, square samples were cut 100 millimeters on a side and marked for identification in the with machine direction and the cross machine direction. Each sample was placed between two screens and immersed in hot water at 200° F. for 60 seconds. The samples were withdrawn from the water, dried, and measured in both the with machine and cross machine directions. The amount of shrinkage, in millimeters was noted directly as the percent free shrink.

In the test for the hot strength, two strips of film, each one inch wide, were placed in face-to-face relationship, with the thickest layers, layers 16, facing each other. These strips were joined together on one end using 2-sided adhesive tape. The joined ends were fastened in face-to-face relationship, to a stationary clamp. The other end of one of the two strips was firmly clamped to a stress gauge. Approximately 2 inches from the stress gauge, an impulse heat seal was formed across the width of the two facing test strips. The seal was formed by an impulse sealer set for 30 volts and 55 amps and a dwell time of 0.7 second. Immediately after formation of the seal, and while the film was still hot, the stress gauge was pulled in a straight line direction away from the stationary end, a distance of about an inch, more or less.

As the gauge was pulled, putting tensile stress on the film, the stress induced elongation primarily at the still-hot seal area. The seal area continued to elongate and in some cases it broke. The amount of pulling force registered by the stress gauge initially increased as the gauge was pulled, until the maximum stress was recorded. The maximum stress recorded was reported as ounces of pulling force. This pulling force is a measure of the hot strength of the film which corrolates to the capability of the film to withstand hot processes, including the formation of heat seals.

Table 2 shows the results of the free shrink and hot strength tests on the examples.

TABLE 2

Test Results

| Sample | Free Shrink MD | Free Shrink CMD | Hot Strength |
| --- | --- | --- | --- |
| Example 1 - No irradiation | 40% | 48% | 3 oz |
| Example 1 - 4.5 megarads | 36% | 44% | 22 oz |
| Example 2 - No irradiation | 40% | 48% | 3 oz |
| Example 2 - 4 megarads | 36% | 43% | 11 oz |
| Example 2 - 8 megarads | 34% | 40% | 39 oz |
| Example 3 - 1 megarad | 40% | 48% | 5 oz |
| Example 3 - 3 megarads | 37% | 46% | 11 oz |
| Example 3 - 5 megarads | 36% | 44% | 24 oz |

As can be seen from Table 2, the free shrink was slightly decreased by the radiation treatment, but was not changed by any amount that would affect the overall utility of the film. Hot strength, on the other hand, was greatly enhanced in those films which had been subjected to radiation treatment.

Figure 3:
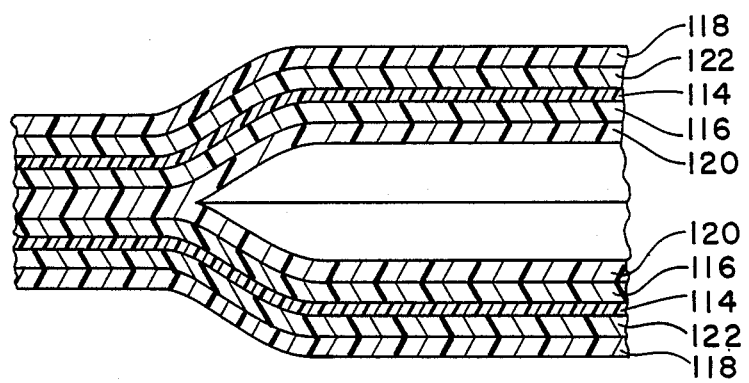
FIG. 3 is a cross-section as in FIG. 2, but showing a bag made from a 5 layer film structure of the invention.

A more complex form of the invention is a 5 layer polymeric structure as seen in FIG. 3. In this structure, layer 114 typically represents the barrier layer. Layer 118 serves as the exterior, abuse resistant layer. Layer 120 is the interior, or heat seal layer. Layers 116 and 122 serve primarily as transition layers between layer 114 and layers 118 and 120. Layers 116 and 122 may also provide, as can any of the layers, certain desirable structural and strength benefiting properties.

In one structure, layers 116 and 122 are EVA and layers 118 and 120 are either LLDPE or a blend of LLDPE with EVA. Layer 114 is the barrier layer of VDC-CP, and preferably VDC-MA. In another structure, layer 114 is VDC-CP, layers 116 and 122 are LLDPE and layers 118 and 120 are EVA. Likewise, both pairs of layers, wherein 116 and 122 are a first pair and 118 and 120 are a second pair, may be blends of LLDPE and EVA.

Layers 114, 116, and 122 are cross-linked by exposure to at least 1.5 megarads of electron beam irradiation. Alternately, all the layers of the 5 layer film may be simultaneously cross-linked by exposure to electron beam irradiation.

The irradiation serves at least two significant purposes. First, it enhances the hot strength of the film. This is evidenced by expanded ranges of heat sealing temperatures, and by reduced failure rates in packages which have been heat shrunk or heat sealed. Second, the timing of the irradiation treatment being after the formation of the multiple layer film, substantial freedom is available in selecting the process for fabricating the multiple layer film. Thus the processes which tend to yield higher interfacial adhesion, such as coextrusion, are preferred. Because more desirable formation processes can be used, the resulting films may have substantially improved interfacial adhesion over similar films made by less desirable processes. For example, the previously known film produced by the previously known process, both being described briefly in the Background of the Invention herein, and which process uses a coating step in the film formation, was tested. Peeling was started with the aid of solvent. Once peel was started, the peeling could be easily propagated by force of 10 to 15 grams per inch width. Those skilled in the art will recognize that this level of peel strength represents a low level of interfacial adhesion. By comparison, films of EXAMPLES 1 and 3 were tested for peel strength.

In all the peel tests, samples used were strips one inch wide by about 3 to 6 inches long. To start the layers in separation, one end of the strip was wetted in a solvent of either acetone or methyl ethyl ketone to facilitate initial layer separation. Initial layer separation was carefully facilitated and was propagated by hand until a sufficient length had been separated. The separated layers could then be attached to the jaws of an Instron tensile analyzer. The layers were then pulled apart and the interfacial adhesion was recorded as the maximum grams of force used to pull the layers apart at the interface.

In attempting to determine the comparative interfacial adhesion of films of the invention, it was found in all cases that the layers could not be separated by the conventional technique of separating the layers by use of adhesive tape. In some cases, separation could not even be initiated with the use of solvents. In all other cases, separation could be initiated by the use of solvent, but upon pulling as per the Instron tensile test, failure of one of the film layers was observed. This is interpreted to mean that interlayer adhesion strength exceeds the tensile strength of at least one of the layers, and thus the layers cannot be separated in the conventional sense of peeling them apart at any one of the layer interfaces.

As evidenced by the hot strength test, the films of the invention can readily be made into bags for packaging using heat seals. Thus it is seen that the invention provides novel film structures and bags, and novel processes for making films having improved properties for packaging uses; the novel processes being competitive and economical by virtue of a reduction in the number of processing steps and by each of the steps being susceptible to being performed on conventional-type equipment.

The word package as used herein is defined to include container articles which do not have a product therein as well as container articles which do have product contained therein. A package may be sealed or may have an opening therein.

Having thus described the invention, what is claimed is:

1. A process for making a multiple layer molecularly oriented film, said process comprising the steps of:
   (a) forming a multiple layer film having first and second layers whose compositions comprise at least 10% by weight ethylene vinyl acetate copolymer and a third layer of vinylidene chloride copolymer disposed between said first and second layers;
   (b) heating said multiple layer film to an elevated temperature appropriate for molecular orientation, and molecularly orienting said multiple layer film; and
   (c) after said orienting of said multiple layer film, subjecting said multiple layer film, containing said first, second, and third layers, to irradiation in an amount of at least 1.5 megarads, said irradiation after said orienting comprising an initial irradiation exposure for each of said first, second, and third layers.

2. A process as in claim 1 and wherein the composition of at least one of said first and second layers is a blend of 10% by weight to 90% by weight linear low density polyethylene and 90% to 10% ethylene vinyl acetate.

3. A process as in claim 2 wherein said multiple layer film is formed having, as the composition of said third layer, a vinylidene chloride-methylacrylate copolymer.

4. A process for making a multiple layer molecularly oriented film, said process comprising the steps of:
   (a) forming a multiple layer film having first and second layers whose compositions comprise at least 10% by weight ethylene vinyl acetate copolymer, and a third layer of vinylidene chloride copolymer, disposed between said first and second layers;
   (b) heating said multiple layer film to an elevated temperature appropriate for molecular orientation, and molecularly orienting said multiple layer film;
   (c) holding said film at an appropriate elevated temperature and thereby heat setting it; and
   (d) after said orienting of said multiple layer film, subjecting said multiple layer film, containing said first, second, and third layers, to irradiation in an amount of at least 1.5 megarads, said irradiation after said orienting comprising an initial irradiation exposure for each of said first, second, and third layers.

5. A process as in claim 4 wherein the composition of at least one of said first and second layers is a blend of 10% by weight to 90% by weight linear low density polyethylene and 90% to 10% ethylene vinyl acetate.

6. A process as in claim 4 wherein said multiple layer film is formed having, as the composition of said third layer, a vinylidene chloride-methyacrylate copolymer.

7. A process for making a multiple layer molecularly oriented film, said process comprising the steps of:
   (a) forming a multiple layer film having first and second layers whose compositions comprise at least 10% by weight ethylene vinyl acetate copolymer and a third layer of vinylidene chloride-methylacrylate copolymer disposed between said first and second layers:
   (b) heating said multiple layer film to an elevated temperature appropriate for molecular orientation, and molecularly orienting said multiple layer film; and
   (c) subjecting said multiple layer film, containing said first, second, and third layers, to irradiation in an amount of at least 1.5 megarads,
   and wherein said heating and orienting in subparagraph (b) is performed before irradiation of any one of said first, second, and third layers.

8. A process for making a multiple layer molecularly oriented film, said process comprising the steps of:
   (a) forming a multiple layer film having first and second layers whose compositions comprise at least 10% by weight ethylene vinyl acetate copolymer and a third layer of vinylidene chloride-methylacrylate copolymer, disposed between said first and second layers;
   (b) heating said multiple layer film to an elevated temperature appropriate for molecular orientation, and molecularly orienting said multiple layer film;
   (c) holding said film at an appropriate elevated temperature and thereby heat setting said multiple layer film; and
   (d) subjecting said multiple layer film, containing said first, second, and third layers, to irradiation in an amount of at least 1.5 megarads,
   and wherein said heating and orienting of subparagraph (b) is performed before irradiation of any one of said first, second, and third layers.

9. A process for making a multiple layer film, said process comprising the steps of:
   (a) forming a multiple layer film having (i) first and second layers comprising about 65% to 75% by weight ethylene vinyl acetate, said ethylene vinyl acetate comprising 7 to 9 mole percent vinyl acetate, and 35% to 25% by weight linear low density polyethylene copolymer and (ii) a third layer of vinylidene chloride methylacrylate copolymer disposed between said first and second layers;
   (b) subjecting said multiple layer film, containing said first, second and third layers to irradiation in an amount of at least 1.5 megarads; and
   (c) including, before said irradiation of any of said first, second, and third layers, the step of heating said multiple layer film to an elevated temperature appropriate for molecular orientation and molecularly orienting it.

10. A process as in claim 9 and including the step of holding said film at an appropriate elevated temperature and thereby heat setting it.

11. A process for making a multiple layer molecularly oriented film, said process comprising the steps of:
    (a) coextruding a multiple layer film having first and second layers whose compositions comprise at least 10% by weight ethylene vinyl acetate copolymer and a third layer of vinylidene chloride-methylacrylate copolymer disposed between said first and second layers;
    (b) before irradiation of said coextruded multiple layer film, heating said multiple layer film to an elevated temperature appropriate for molecular orientation, and molecularly orienting said multiple layer film; and
    (c) after said orienting of said multiple layer film, subjecting said multiple layer film, comprising said first, second, and third layers, to irradiation in an amount of at least 1.5 megarads, said irradiation after said orienting comprising an initial irradiation exposure for each of said first, second, and third layers.

12. A process as in claim 11 wherein the composition of at least one of said first and second layers is a blend comprising 10% by weight to 90% by weight linear low density polyethylene and 90% to 10% ethylene vinyl acetate.

13. A process for making a multiple layer molecularly oriented film, said process comprising the steps of:
   (a) coextruding a multiple layer film having first and second layers whose compositions comprise at least 10% by weight ethylene vinyl acetate copolymer and a third layer of vinylidene chloride-methylacrylate copolymer disposed between said first and second layers;
   (b) before irradiation of said coextruded multiple layer film, heating said multiple layer film to an elevated temperature appropriate for molecular orientation, and molecularly orienting said multiple layer film;
   (c) holding said film at an appropriate elevated temperature and thereby heat setting it; and
   (d) after said orienting of said multiple layer film, subjecting said multiple layer film, comprising said first, second, and third layers, to electron beam irradiation in an amount of at least 1.5 megarads, said irradiation after said orienting comprising an initial irradiation exposure for each of said first, second, and third layers.

14. A process as in claim 13 wherein the composition of at least one of said first and second layers is a blend comprising 10% by weight to 90% by weight linear low density polyethylene and 90% to 10% ethylene vinyl acetate.

15. A process for making a multiple layer molecularly oriented film, said process comprising the steps of:
   (a) coextruding a multiple layer film having first and second layers whose compositions comprise at least 10% by weight ethylene vinyl acetate copolymer and a third layer comprising vinylidene chloride-methylacrylate copolymer disposed between said first and second layers;
   (b) heating said multiple layer film to an elevated temperature appropriate for molecular orientation, and molecularly orienting said multiple layer film; and
   (c) subjecting said multiple layer film, comprising said first, second, and third layers to irradiation in an amount of at least 1.5 megarads,
   and, wherein said heating and orienting in subparagraph (b) is performed before irradiation of any layer of said multiple layer film.

16. A process as in claim 15 wherein the composition of at least one of said first and second layers is a blend comprising 10% by weight to 90% by weight linear low density polyethylene and 90% to 10% ethylene vinyl acetate.

17. A process for making a multiple layer film, said process comprising the steps of:
   (a) coextruding a multiple layer film having (i) first and second layers comprising about 65% to 75% by weight ethylene vinyl acetate, said ethylene vinyl acetate comprising 7 to 9 mole percent vinyl acetate, and 35% to 25% linear low density polyethylene copolymer and (ii) a third layer of vinylidene chloride-methylacrylate copolymer disposed between said first and second layers;
   (b) subjecting said multiple layer film, containing said first, second, and third layers to irradiation in an amount of at least 1.5 megarads; and
   (c) including, before said irradiation of said multiple layer film, the step of heating said multiple layer film to an elevated temperature appropriate for molecular orientation, and molecularly orienting it.

18. A process as in claim 17, said irradiation after said orientation comprising an initial irradiation exposure for each of said first, second, and third layers.

19. A process as in claim 11, said multiple layer film comprising a plurality of layer interfaces, and wherein said film cannot be peeled apart at any one of said interfaces.

20. A process as in claim 12, said multiple layer film comprising a plurality of layer interfaces, and wherein said film cannot be peeled apart at any one of said interfaces.

21. A process as in claim 13, said multiple layer film comprising a plurality of layer interfaces, and wherein said film cannot be peeled apart at any one of said interfaces.

22. A process as in claim 14, said multiple layer film comprising a plurality of layer interfaces, and wherein said film cannot be peeled apart at any one of said interfaces.

23. A process as in claim 15, said multiple layer film comprising a plurality of layer interfaces, and wherein said film cannot be peeled apart at any one of said interfaces.

24. A process as in claim 16, said multiple layer film comprising a plurality of layer interfaces, and wherein said film cannot be peeled apart at any one of said interfaces.

25. A process as in claim 18, said multiple layer film comprising a plurality of layer interfaces, and wherein said film cannot be peeled apart at any one of said interfaces.

* * * * *